July 28, 1959

J. K. GAYLORD 2,896,749

COOLING MEANS FOR BRAKE DRUMS

Filed Nov. 23, 1953

INVENTOR.
James K. Gaylord
BY
Gary, Desmond & Parker
Attys.

July 28, 1959
J. K. GAYLORD
2,896,749
COOLING MEANS FOR BRAKE DRUMS
Filed Nov. 23, 1953
3 Sheets-Sheet 2
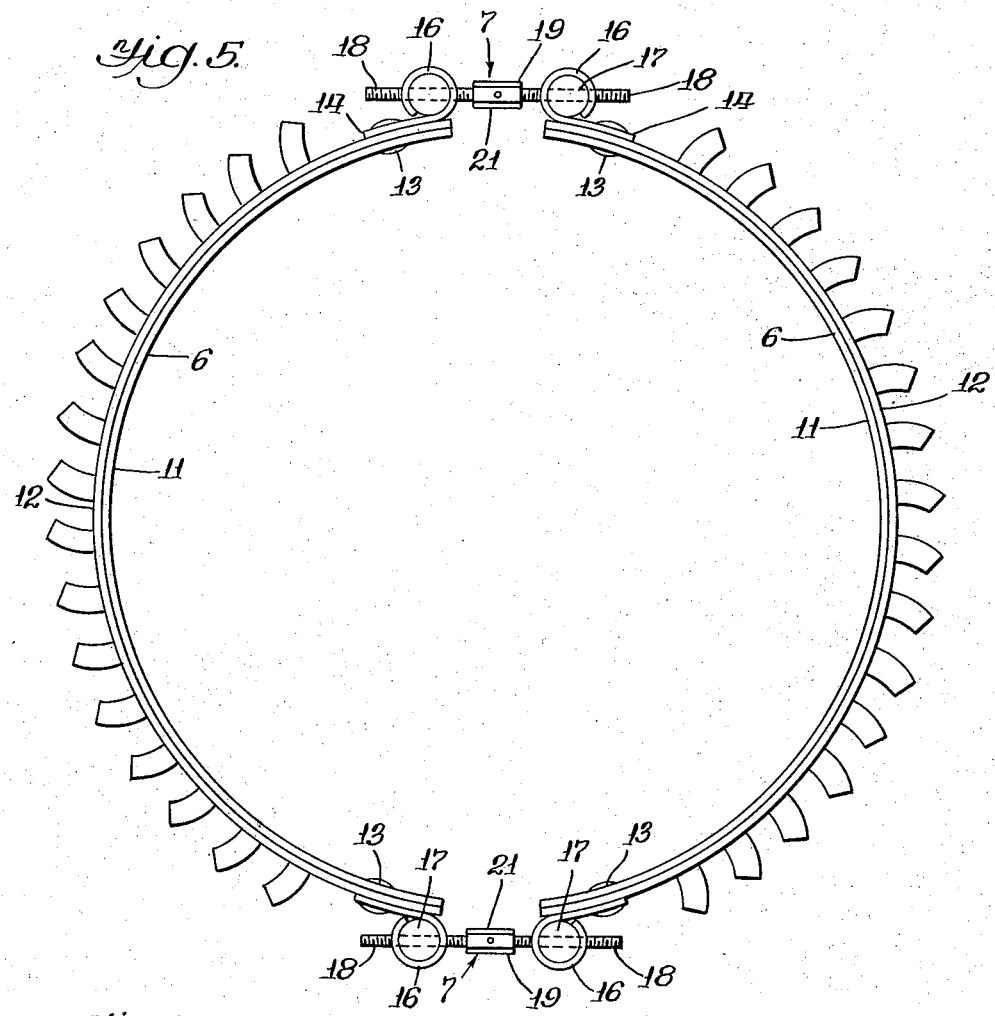
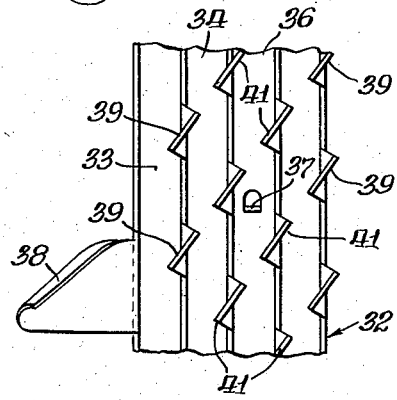
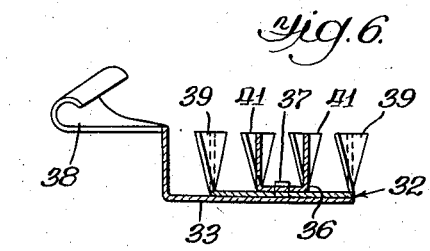
INVENTOR.
James K. Gaylord
BY
Gary, Desmond & Parker
Attys

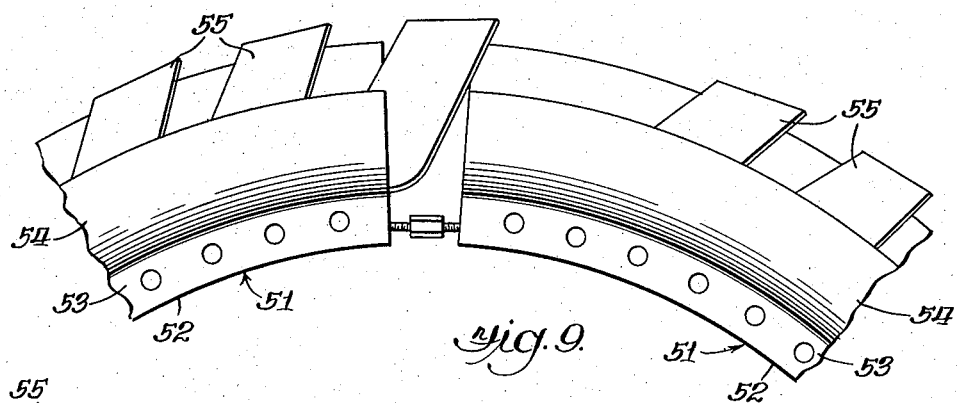
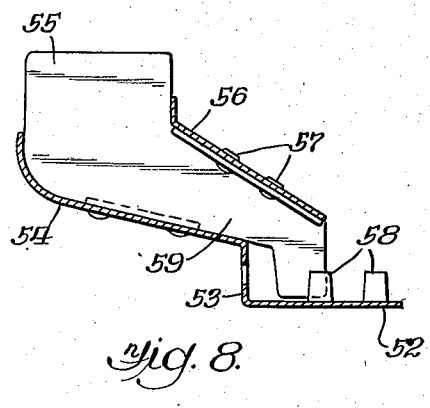
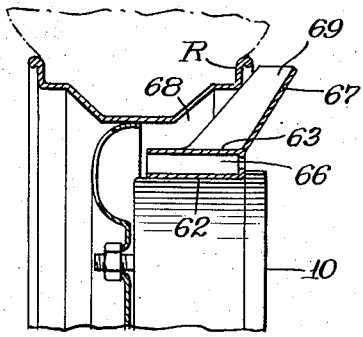
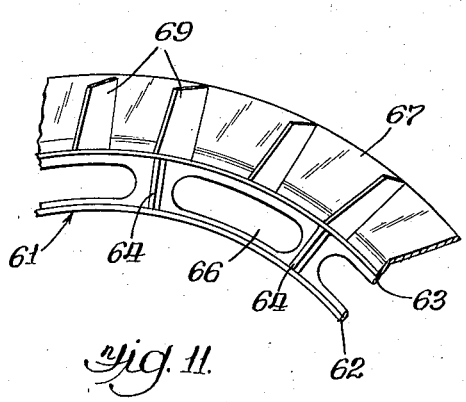
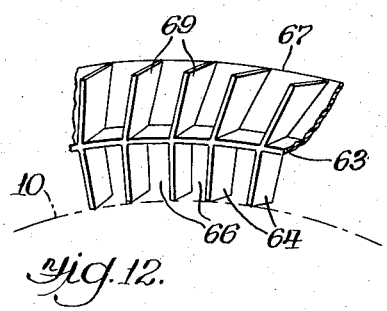

United States Patent Office 2,896,749
Patented July 28, 1959

2,896,749
COOLING MEANS FOR BRAKE DRUMS

James K. Gaylord, Chicago, Ill., assignor to Gaylord Products, Incorporated, Chicago, Ill., a corporation of Delaware Application November 23, 1953, Serial No. 393,613

1 Claim. (Cl. 188—264)

This invention relates to cooling means for brake drums, and more particularly to means effective to transfer heat from a vehicle brake drum to the atmosphere during operation of the vehicle.

It is well known in this art that the kinetic energy of a moving vehicle is converted into heat during frictional engagement of the brake shoes with a brake drum, and that the heat thus generated tends to greatly shorten the service life of the brake lining and brake drums, particularly when the brakes are applied over an extended period of time.

While various methods have heretofore been suggested for preventing overheating of brake drums during frictional engagement thereof by brake shoes, such as by incorporating a lubricant in the brake lining to reduce the coefficient of friction, and by casting the brake drum with cooling fins thereon, the results accomplished by such methods have not proved entirely satisfactory as lubricated brake lining does not provide the desired substantially constant coefficient of friction necessary to efficient braking, and as only a negligible amount of heat is transferred through a cast steel fin type drum to the atmosphere during braking action of a vehicle, due to the relatively low coefficient of heat conductivity of cast steel.

It is, therefore, an object of the invention to provide means effective to transfer sufficient amounts of heat from brake drums to the atmosphere to prevent burning and disintegration of brake lining and scoring of brake drums during braking action.

Another object of the invention resides in the provision of cooling elements adapted to be mounted on conventional automobile brake drums to conduct heat therefrom to the atmosphere, the cooling elements being formed of aluminum or other metal having a relatively high coefficient of heat conductivity.

A further object of the invention resides in the provision of cooling elements adapted to be readily clamped in fixed position about the peripheral surface of conventional brake drums, the cooling elements being either cast or fabricated from sheet metal and comprising either a single split ring having means to draw its ends together or a. multiple section ring comprising a plurality of interconnected ring segments engaged by one or more clamping devices.

Another object of the invention resides in the provision of a cooling device secured to a brake drum and embodying a plurality of radially disposed circumferentially spaced heat radiating fins formed and arranged to move streams of cooling air therebetween during movement of a vehicle to serve as a heat transfer medium between the drum and the surrounding atmosphere.

This invention embodies other novel features, details of construction and arrangement of parts which are hereinafter set forth in the specification and claim and illustrated in the accompanying drawings, wherein:

Fig. 5 is an end view illustrating the means employed to secure the cooling device to a brake drum.

Fig. 6 is a fragmentary transverse sectional view illustrating a modified form of the invention.

Fig. 7 is a fragmentary plan view of same.

Fig. 8 is a fragmentary transverse sectional view illustrating another modified form of the invention.

Fig. 9 is a fragmentary end elevational view of same.

Fig. 10 is a fragmentary transverse sectional view illustrating another modified form of the invention.

Fig. 11 is a fragmentary perspective view of same.

Fig. 12 is a fragmentary perspective view, corresponding to Fig. 11, illustrating another modified form of the invention.

Figure 1:
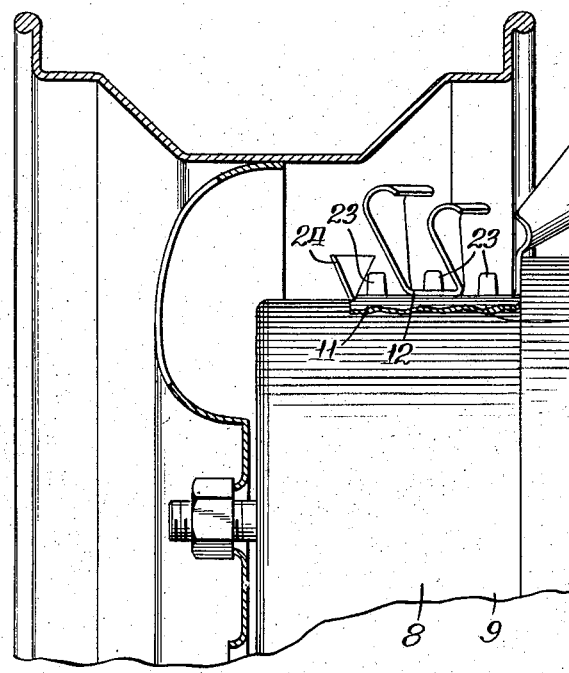
Fig. 1 is a fragmentary transverse sectional view illustrating a brake drum cooling device embodying features of the present invention.

Referring now to the drawings for a better understanding of the present invention and more particularly to Figs. 1 to 5 therein, the brake drum cooling device is shown as comprising a plurality of ring segments 6 joined together at their ends by means of turnbuckles, indicated generally at 7, which serve to clamp the segments against the outer surface 8 of the flange 9 of a conventional brake drum 10 engaged to an automobile wheel 5.

Each ring segment 6 is shown as comprising an inner section 11 and an outer section 12, said sections being blanked and formed from sheet metal, such as aluminum, having relatively high coefficient of heat conductivity and having their adjacent ends secured together by rivets 13. As illustrated in Fig. 5, the rivets 13 are also adapted to secure brackets 14 to the ends of the ring segments 6, each bracket being formed of strip metal having an eye 16 which serves as a bearing for a cylindrical plug 17. Each eye 16 is provided intermediate its ends with diametrically opposed apertures for registry with a threaded opening in its related plug 17. Reversely threaded ends 18—18 of a stud 19 are threaded into the threaded openings of adjacent plugs 17, and the medial portion 21 of the stud is hexagonal in section and provided with transverse openings for engagement by a wrench or pin, respectively, to rotate the stud to clamp the ring segments 6 against the outer surface 8 of the brake drum 10.

It is well known in this art that conventional brake drums are usually formed with frustro-conical outer surfaces 8 tapering outwardly slightly toward the edge of the flange 9. By forming the cooling device of a plurality of ring segments 6 joined together by turnbuckles, the several ring segments may be drawn in tight complementary engagement with the tapered outer surface 8 to avoid an insulating air space therebetween. To insure a high rate of heat transfer from the brake drum to the ring segments 6, the mating surfaces of the brake drum and ring segments are coated with an aluminum paste which serves to fill in small recesses in or pockets defined between said surfaces and to conduct heat therebetween.

Figure 2:
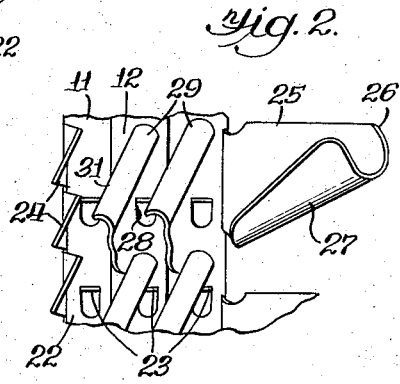
Fig. 2 is a fragmentary plan view of same.
Figure 3:
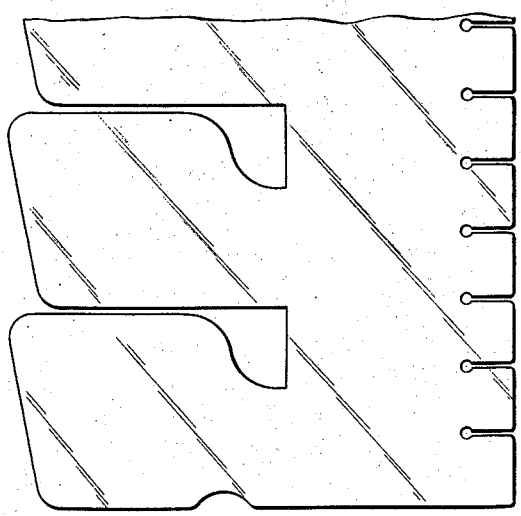
Fig. 3 is a fragmentary plan view illustrating a blank of sheet metal prior to being formed to provide an inner section of the cooling device.
Figure 4:
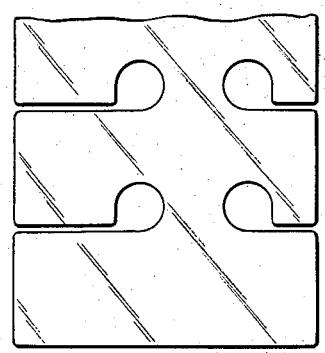
Fig. 4 is a fragmentary plan view illustrating a blank of sheet metal prior to being formed to provide an outer section of the cooling device.

As illustrated in Figs. 1 to 3, the inner section 11 of each ring segment 6 is preferably blanked and formed from sheet aluminum to provide an arcuate body 22 having a series of rows of tabs 23 projecting radially therefrom. A row of outboard cooling fins 24 project radially from the outboard edge of the body 22 and are twisted to dispose their free ends at acute angles to the plane of the brake drum, whereby the fins act as impeller blades to draw air transversely outboardly and across the outer surface of the body to cool the latter during rotation of the wheel 5.

A plurality of inboard fins or blades 26 are provided along the inboard edge of the body 22 and project outwardly and laterally therefrom at acute angles to the axis of the brake drum, each fin having a leading edge 25 and an arcuate trailing portion 27 curving outwardly from and thence inwardly toward the body to serve as a funnel or air scoop in moving a stream of cooling air outboardly toward and then across the outer surface of the body toward the outboard cooling fins 24. It will be noted that each trailing portion 27 projects outwardly at an acute angle from the axis of the brake drum and also projects outwardly at an angle from the plane of said drum toward its leading edge 25 and acts as a funnel or air scoop in directing air toward the brake drum surface 8.

The outer section 12 of each ring segment 6 is blanked and formed from sheet aluminum to provide a row of apertures 28 to receive a row of tabs 23 on the inner section 11, which row of tabs may be bent downwardly against the outer section to secure the latter in snug engagement against the inner section. Opposite side edges of the outer section are slit and formed to provide two rows of intermediate cooling fins 29—29, each fin being twisted intermediate its ends with its outer end bent along an arc at 31 toward the inboard cooling fins 26, and adapted to direct air axially toward the outboard end of the brake drum. A suitable aluminum paste coating may be provided between the inner and outer sections 11 and 12 to conduct heat from the inner section to the outer section.

Figs. 6 and 7 in the drawings illustrate a modified form of the invention in which the cooling device comprises a plurality of ring segments 32 adapted to be secured together at their ends by means of turnbuckles, as heretofore shown and described in connection with the form of the invention illustrated in Figs. 1 to 5. In this form of the invention each ring segment comprises an inner section 33 to engage a brake drum, an intermediate section 34, and an outer section 36. The inner section is formed with a row of tabs 37 to project through aligned apertures in the intermediate and outer sections, the outer ends of the tabs being bent downwardly against the outer section to secure the several sections in assembled relation. A suitable heat conductive aluminum paste may be interposed between the several sections.

The inner section 33 is formed along the inboard edge thereof with a row of relatively large inboard blades 38 similar to the blades 26 to direct cooling air outboardly across the ring segments. Intermediate cooling fins 39 are formed in two rows along the sides of the intermediate section 34, and cooling fins 41 are formed in two rows along the sides of the outer section 36.

Figs. 8 and 9 illustrate another modified form of the invention in which the cooling device is shown as comprising a plurality of ring segments 51 joined together at their ends by turnbuckles to clamp the segments against the outer surface of a brake drum.

Each ring segment is shown as comprising a body member as blanked and formed from sheet aluminum to provide an arcuate drum engaging portion 52, a radial web portion 53, and a flange portion 54. A plurality of spaced blades 55 are secured to the flange portion by rivets (not shown) and are also secured to an outer plate 56 by rivets 57. The blades are inclined to direct streams of air inwardly between the flange portion 54 and outer plate 56 toward and across the drum engaging portion 52 during rotational movement of the device.

A plurality of rows of radially disposed tongues 58 are formed on the drum engaging portion 52 for the transfer of heat from the brake drum to the streams of cooling air passing axially through the circumferentially spaced passages 59 defined by the web portion 53, blades 54 and outer plate 56.

Figs. 10 and 11 illustrate another modified form of the invention in which the cooling device is shown as comprising a plurality of ring segments 61 in the form of metal castings adapted to be arranged end to end about the periphery of brake drum 10 and clamped tightly thereon by means of turnbuckles, as illustrated in Fig. 5.

In this form of the invention, each ring segment is shown as comprising spaced inner and outer walls 62 and 63 joined together at spaced intervals by radial webs 64 which define therewith air passageways 66. A flange 67 extends along the inboard edge of the outer wall 63 and slopes inboardly thereof to define with a tire rim R an air passageway 68 communicating with the passageways 66. A plurality of cooling fins 69 project radially from the outer wall 63 and outboardly from the flange 67 to transfer heat from the ring segment to air passing outwardly through the passageway 68.

Fig. 12 illustrates another modified form of the invention in which the cooling device comprises a structure similar to the device described in connection with Figs. 10 and 11 in the drawings, except for the omission of the inner wall 62, and corresponding numbers have been applied to corresponding parts.

In each of the several forms of the invention herein shown and described it will be noted that each form of cooling device may be generally in the form of a split ring or as several ring segments engaged end to end to form a ring, and that they may be readily secured in tight clamping engagement around a conventional brake drum by means of turnbuckles provided thereon.

While this invention has been shown in several forms, it is obvious to those skilled in the art that it is not so limited, but is susceptible of various changes and modifications without departing from the spirit and scope of the claimed invention.

I claim as my invention:

In a cooling device for detachable circumferential rigid clamping engagement around the annular outer surface of a brake drum of an internally expanding brake comprising, a generally ring-shaped body comprising ring segments interconnected by mechanical fastening means, said segments being urged toward each other by said mechanical fastening means to clamp the body tightly against the outer surface of a brake drum, said body comprising radially superimposed contacting inner and outer sheet metal sections carrying struck up heat radiating fins.

References Cited in the file of this patent

UNITED STATES PATENTS

| | | |
|---|---|---|
| 1,912,789 | Norton | June 6, 1933 |
| 1,924,060 | Huck | Aug. 22, 1933 |
| 1,927,305 | Campbell | Sept. 19, 1933 |
| 1,935,388 | Bragg et al. | Nov. 14, 1933 |
| 2,182,238 | Rasmussen | Dec. 5, 1939 |
| 2,265,938 | Eksergian | Dec. 9, 1941 |
| 2,563,769 | Wyant | Aug. 7, 1951 |
| 2,659,460 | Lyon | Nov. 17, 1953 |

FOREIGN PATENTS

| | | |
|---|---|---|
| 674,380 | France | Oct. 21, 1929 |
| 572,202 | Great Britain | Sept. 27, 1945 |